United States Patent [19]

Davis et al.

[11] Patent Number: 5,064,093
[45] Date of Patent: Nov. 12, 1991

[54] PRODUCT CUP DENESTER

[75] Inventors: Steven D. Davis, Yuciapa; Samuel O. Sanchez, Jr., Redlands, both of Calif.

[73] Assignee: W. A. Lane, Inc., San Bernardino, Calif.

[21] Appl. No.: 509,724

[22] Filed: Apr. 16, 1990

[51] Int. Cl.$^5$ .............................................. B65H 3/28
[52] U.S. Cl. .................................. 221/222; 414/797.7
[58] Field of Search ....................... 221/222, 221, 223; 271/109; 414/797.7, 795.7, 795.6

[56] References Cited

U.S. PATENT DOCUMENTS 2,840,963 7/1958 Osmond .............................. 221/222
4,943,207 7/1990 Provan .............................. 221/222

FOREIGN PATENT DOCUMENTS 2740921 3/1979 Fed. Rep. of Germany ...... 221/222
2582291 11/1986 France .............................. 221/222

Primary Examiner—Robert P. Olszewski
Assistant Examiner—Kenneth Noland
Attorney, Agent, or Firm—Herb Boswell

[57] ABSTRACT

A denesting device for separating trays of joined cups prior to loading of the cup trays onto a conveyer belt of a packaging machine includes a feed bin mounted on a housing for receiving a stack of the nested cup trays. Associated with the bottom of the feed bin are a plurality of elongated helical screws each of which has a variable screw thread formed thereon. The variable screw thread on each of the helical screws has a variable pitch that increases from a first lesser pitch portion which is located adjacent to the feed means to a second greater pitch portion from which the denested cup trays are discharged. The plurality of elongated helical screws are rotatively mounted on the housing in a spaced array about the feed means. A drive mechanism rotates the elongated helical screws whereby upon rotation of the screws the first lesser pitch portion of the variable screw threads of the helical screws engages an edge of the cup trays stacked in the feed means and continued rotation of the helical screws moves the cup trays along the variable screw threads from the lesser thread pitch portion to the greater thread pitch portion with separation and denesting of the adjacent cup trays initiated and then increased as the cup trays move along the variable screw threads of the helical screws.

17 Claims, 3 Drawing Sheets

Fig. 1

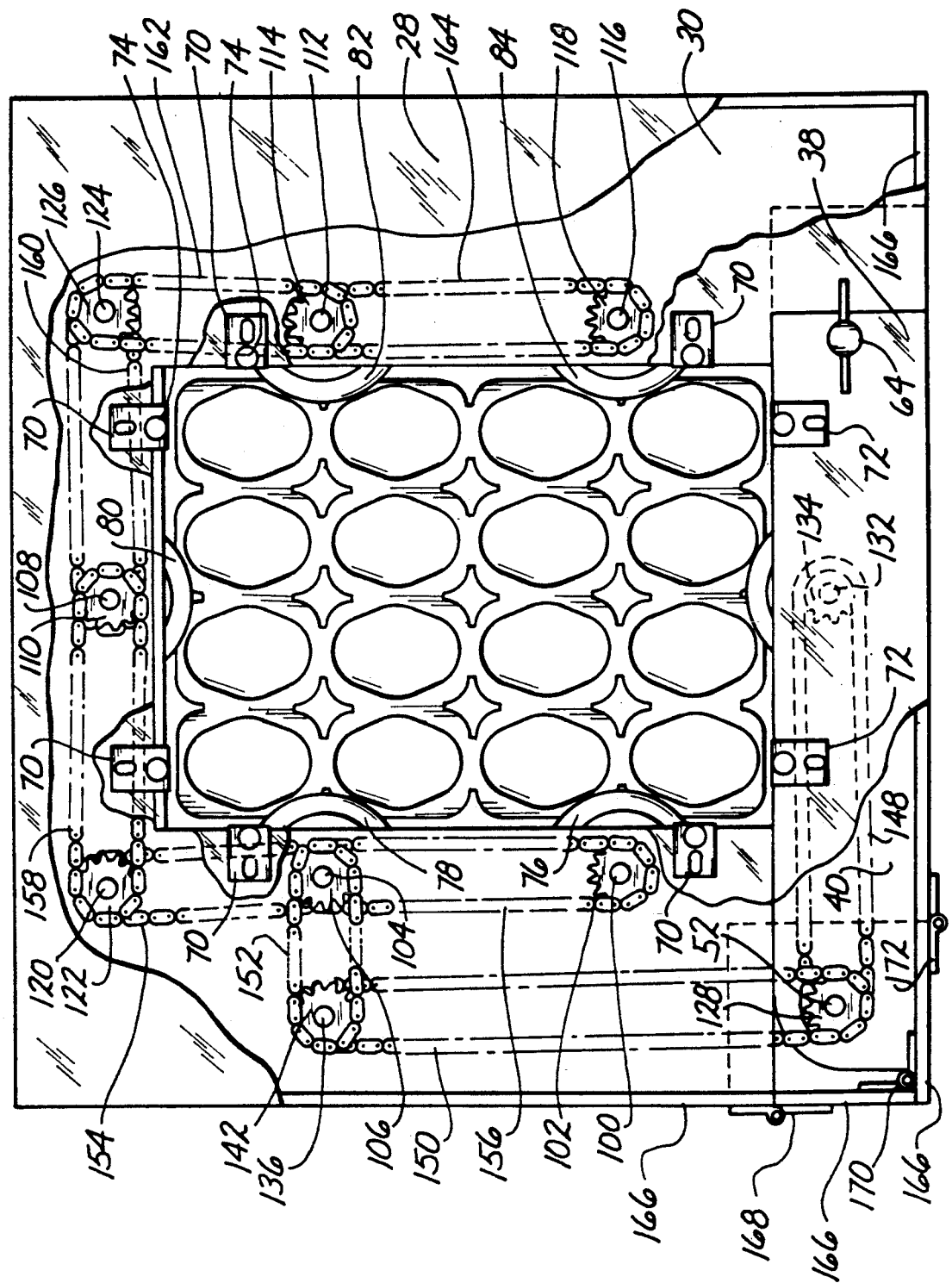

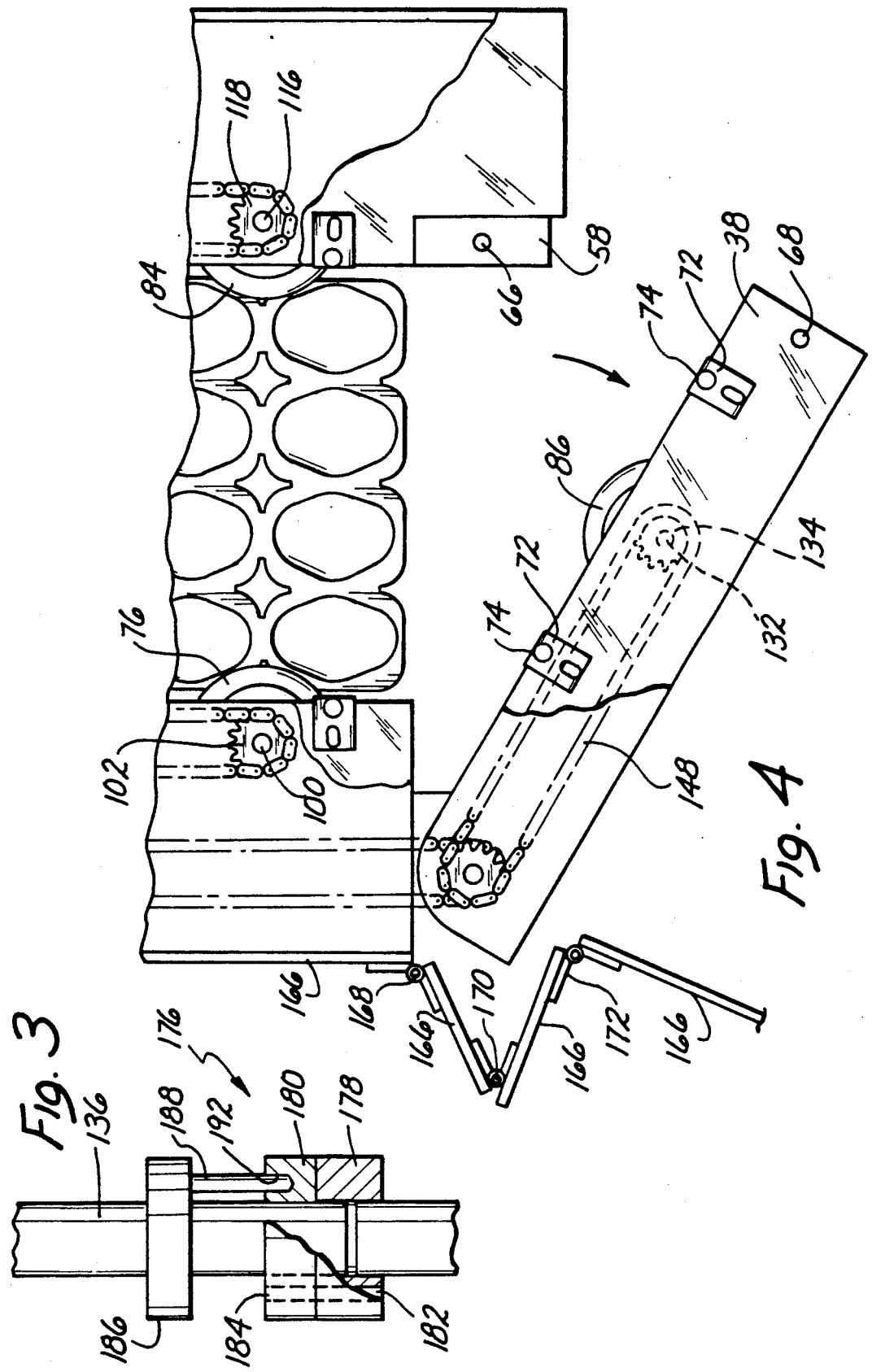

PRODUCT CUP DENESTER

BACKGROUND OF THE INVENTION

This invention is directed to a device for denesting stacked articles particularly nested stacks of cup trays.

A variety of sauces and condiments are packaged for the fast food industry in individual serving cups. These cups are designed to hold a single serving of the sauce or condiment. The cups are dispensed individually to the consumer at the point of purchase of a product.

The cups are formed of a body having a reservoir for holding the contents. The body further includes a flange that is integrally formed with the reservoir. A lid is sealed over the flange to maintain the integrity of the contents of the cup prior to dispensing to the consumer. The lid can be pealed away from the flange to expose the contents in the cup reservoir for consumption by the consumer.

These cups are filled with product and sealed with a lid on machines generally identified as cup fill and seal packaging machines. For use with a fill and seal cup packaging machine, the cups initially are formed in a joined matrix or "cup tray" by vacuum forming a sheet of a suitable material such as polyethylene or the like. Typically the matrix of the cup tray has, for example, 4 by 5 or 5 by 5 rows and columns of cups arranged in a two dimensional matrix. The cup trays are loaded on the cup fill and seal packaging machine for loading with product and sealing with a lid. After filling and sealing, the individual cups in the matrix or tray are then separated from one another on the cup packaging machine. The separated cups are bulk packaged and dispensed to a retail outlet for ultimately dispensing to consumers.

For moving and supporting the cups on the cup packaging machine, the cup packaging machine utilizes a continuous belt formed of individual linked belt segments. Cup trays are located on the continuous belt by loading the cup trays onto the continuous belt such that the cup bodies fit into depressions on adjacent linked segments of the continuous belt. The belt then moves the cup bodies under the appropriate filling, sealing and cutting heads of the packaging machine.

Generally the cups trays for use on the cup packaging machine are formed at a different location by a manufacture specializing in vacuum forming of the same. They are then shipped in a stacked nested state, that is, stacked one upon another, to a product packager for use on a cup fill and seal packaging machine. To stack and nest the cup trays the bodies of the cups of an overlying tray are inserted into the bodies of the cups of an underlying tray. United States design patent D-289,854 shows a typical cup tray or cup matrix as formed by vacuum forming and ready for loading into a cup packaging machine.

For releasing from the vacuum forming mold and also for facilitating stacking, the cup bodies of a cup tray are formed such that their sides slope or draft at an angle. This allows the cup bodies to be both easily released from the mold and to be nested tightly together in stacking the trays for minimizing the volume for shipping purposes between the vacuum former and the product packager. Because the cup bodies are nested into one another, two adjacent cup trays can frictionally adhere to one another making it difficult to separate the same for loading onto a cup packaging machine.

At the present time two ways are known for loading the cup trays onto the continuous belt of the packaging machine. The first of these is hand loading. This requires an operator to be present at the packaging machine at all times to remove a cup tray from a stack of the same and load them one at a time onto the continuous belt of the packaging machine. This, of course, is very labor intensive as well as being very monotonous work for the operator.

The second method for loading the cup trays onto the continuous belt of the packaging machine utilizes a mechanical device for separating, conveying and dispensing the nested stacked cup trays. This device incorporates suction cups, moving arms, retention fingers and other mechanical components. Operation of this devices requires an arm having suction cups thereon to move over a stack of nested cup trays and then insert its suction cups into the cup bodies of the top member of the stack of cup trays. Suction is applied to grip that top cup tray. Meanwhile the totality of the stack is held by spring fingers such that (and hopefully) only one of the cup trays, the top cup tray, will be lifted from the stack by the suction cups and arms. Once freed from the stack the cup tray must then be moved from the stack to a position for loading onto the continuous belt of the packaging machine. Once in position vacuum must be removed to drop the cup tray onto the continuous belt and the arm must be swung back to pick up the next cup tray.

The above described mechanism is very complicated. It requires many moving parts and continuous formation and release of a vacuum. Depending upon the frictional fit between adjacent cup trays in a stack, the frictional fingers which attempt to retain all but one cup tray during the vacuum denesting process sometimes falter and allow for the simultaneous withdrawal of several trays still tightly frictionally adhering to one another. The still nested stack of two or more trays are then placed in the segments of the continuous belt of the packaging machine. Placement of more than one vertically stacked cup tray in the segments of the continuous belt renders the height of the cups in those segments of the continuous belt greater than that allowed by the working clearance between the cups and the various filling, sealing and cutting heads of the packaging machine. This can cause jams in the machine and other unexpected and undesirable problems.

Since fill and seal cup packaging machines operate at high speeds and because they dispense food products that must be packaged in a sanitary environment, any jamming or other erratic operation of the cup packaging machine can slow down the overall packaging process or, if spillage occurs, may require shutting down the machine to clean and resanitize the machine before further processing can be commenced.

BRIEF SUMMARY OF THE INVENTION

In view of the above it is evident that there exists a need for new and improved denesting devices for loading cup trays onto the continuous belt of a cup fill and seal packaging machine. It is therefore a broad object of this invention to provide such a denesting device. It is a further object of this invention to provide a device which is simple in operation but also capable of high speed operation with minimal operator attendance.

These and other objects as will be evident from the remainder of this specification are achieved in a denesting device which includes a housing, a feed means for containing a stack of nested articles located on the housing and helical screw means for engaging and separating the nested articles. The helical screw means include a variable screw thread thereon with the variable screw thread having a variable pitch that increases from a first lesser pitch portion to a second greater pitch portion. The helical screw means is rotatively located on the housing with the first lesser pitch portion of the variable screw thread located in operative association with the feed means in a position to engage nested articles stacked in the feed means. Further a drive means for rotating the helical screw means is located on the housing. The drive means rotates the helical screw means such that the first lesser pitch portion of the variable screw thread engages articles stacked in the feed means and with continued rotation of the helical screw means the articles are moved along the helical screw means from the lesser thread pitch portion to the greater thread pitch portion. Separation and denesting of adjacent articles is initiated and then increased as the articles move along the helical screw means from the lesser thread pitch portion to the greater thread pitch portion.

In a preferred embodiment of the invention the feed means is sized and shaped to contain a stack of nested cup trays. The cup trays are of the type containing a plurality of cups joined together in a matrix. Each of the plurality of the cups has a cup body. The cup trays are nested by stacking them one on the other with the bodies of cups in one tray partially located in the bodies of cups in the next adjoining tray in the stack.

The helical screw means can include a plurality of elongated helical screws each of which includes a variable screw thread thereon. The helical screws are located on the housing in a spaced array around the feed means. The variable pitch of the variable pitch thread on the helical screws varies from a lesser thread pitch portion to a greater thread pitch portion in a continuously increasing pitch transition. That is, the pitch of the threads continuously changes from a small or lesser pitch to a greater or larger pitch. Preferredly the variable screw threads on each of the plurality of the helical screws is shaped in cross section as a square thread.

The drive means includes a means for rotating each of the plurality of elongated screws in unison at the same rate of rotation and in phase with one another. As so driven a cup tray interlocked into the threads of the plurality of helical screws is progressively and evenly moved down the plurality of helical screws as they rotate in unison.

The housing can include a fixed section and a movable section with the movable section pivotally connected to the fixed section to move with respect to the fixed section. A portion of the elongated helical screws are mounted on the fixed section of the housing and a further portion are mounted on the movable section. That portion of the helical screws mounted on the movable section are movable in concert with the movable section so as to move with respect to the fixed section and the elongated screws mounted thereon. The feed means in turn can also be located in part on the fixed section of the housing and in further part on the movable section of the housing. Likewise the drive means can be located in part on the fixed section and in part on the movable section.

In an embodiment of the invention the drive means includes a rotation means for rotating the helical screws via a prime mover and a further rotation means for rotating the helical screws by hand. The prime mover rotation allows for continuous operation of the device whereas the hand rotation allows for initial feeding during start up of the device.

For rotation of the helical screws via a prime mover, a first shaft is operatively connected to the prime mover so as to be rotated by the prime mover. A second shaft is connected to the helical screws for rotation of the helical screws. A clutch means is interspaced between the first and second shafts such that rotation of the first shaft by the prime mover is transferred to the second shaft via the clutch to rotate the helical screws. By aligning the axis of rotation of the second shaft with the first shaft and including a first bushing attached to the first shaft and a second bushing attached to the second shaft and a further movable bushing both rotatively and axially movable on the first shaft and concurrently including an aperture in both the first and second bushings and a pin on the movable bushing, the pin, by inserting it through the apertures on the first and second bushings, can be utilized to connect the bushings and thus the first and second shafts together for transfer of rotation. By removing the pin from the apertures in the bushings to sever the connection between the first and second shafts, the linkage between the first and second shafts can be disrupted to disconnect the helical screws from rotation by the prime mover.

BRIEF DESCRIPTION OF THE DRAWINGS

This invention will be better understood when taken in conjunction with the drawings wherein:

FIG. 1 is an elevational view of a denesting device of the invention with certain overlaying cover component removed;

FIG. 2 is a top plan view of the device seen in FIG. 1;

FIG. 3 is a fragmentary elevational view of a portion of the device seen in the lower left hand corner of FIG. 1 showing that portion of the device in a different orientation than that seen in FIG. 1; and FIG. 4 is a fragmentary top plan view showing movement of a portion of the device seen in FIG. 2 with respect to the remainder of the device seen in FIG. 2.

This invention utilizes certain principles and/or concepts which are set forth in the claims appended hereto. Those skilled in the packaging arts will realize that these principles and/or concepts are capable of being utilized in a variety of embodiments which may differ from the exact embodiments utilized for illustrative purposes herein. For this reason this invention is not to be construed as being limited solely to the illustrative embodiments, but should only be construed in view of the appended claims.

DETAILED DESCRIPTION OF THE INVENTION

As an aid to understanding this invention a review of certain nomenclature with respect to screw threads will facilitate the understanding of the invention. In utilizing the terminology screw threads, for the purposes of this specification, external threads are indicated. Such external threads are commonly found on bolts as opposed to internal threads which would be found on nuts.

A screw thread as utilized in this specification is formed as a ridge of material that spirals down the surface of a cylinder in a helical manner—that is, the thread continuously spirals down and around the cylindrical surface on which it is formed. The thread has a crest and a root. The crest is the outer most radial portion of the thread with the root being the depression or valley between each two adjacent crests. The pitch of the thread is defined as the distance from a point on one turn of a screw thread to a corresponding point on the next turn of the screw thread measured parallel to the axis of the screw. For a normal bolt or screw the thread has a constant pitch. This constant pitch is usually expressed as the number of threads per inch. This is easily determined by counting the number of crests or the number of roots per each inch of the thread.

For this invention, however, a much different type of screw thread is used. In the instant invention a screw thread is used which has a variable pitch. This variable pitch continuously increases in a smooth uniform manner from one end of the thread to the other. This is quite opposed to a normal constant pitch thread which would have the same pitch, that is the same distance between each of the crests or the roots, along the totality of the length of the thread.

For the helical screw threads of the instant invention the distance between the crests (or the roots) of the turns of the thread as measured between any two adjacent turns of the thread is different than the distance between the crests of the turns of the thread on either side of the reference turn. Thus for the helical screws of the invention on one side of any two particular adjacent turns of the threads the pitch would be less and on the other side it would be greater.

A square thread is generally considered as a thread which, in cross section, has a square shaped root and a square shape across the top of its crests with parallel walls between adjacent turns of the thread. A slight modification of a square thread is an Acme thread which has squared off tops on the crests and roots of the threads, but a slightly inclined wall connecting between each adjacent root and crest.

The present invention is directed to a denesting device for separating and dispensing cup trays or cup matrices, as for instance cup trays similar to those shown in the above referenced United States design patent D-289,854 which issued May 19, 1987 to William A. Lane, et al. As is evident from review of design patent D-289,854, prior to loading onto a cup packaging machine the cup trays include a series of joined cups formed into a row X column type matrix. The specific example shown in the above referred to design patent shows a matrix of 4 by 5 cups. For the remainder of this specification and its claims the terminology "cup tray" (or "trays") is defined as a two dimensional matrix of joined cups similar to those illustrated in Design patent D-289,854.

For use on a fill and seal cup packaging machine the cup trays are deposited onto a continuous moving belt that is formed of linked segments that are located one next to the other. Each linked segment is suitable for accepting the cup bodies along a row of cups of the cup tray. The row of cups in the next column would be deposited into the next linked segment, etc. for the totality of all of the rows of cups in each of the columns in the cup tray.

The cup trays are usually received from the manufacturer thereof in a stacked nested form. The apparatus of the invention receives stacks of these nested cup trays and separates an individual cup tray from the bottom of the stack such that it can then be conveyed or deposited onto the linked segments of the moving continuous belt of the cup fill and seal packaging machine.

Figure 1:
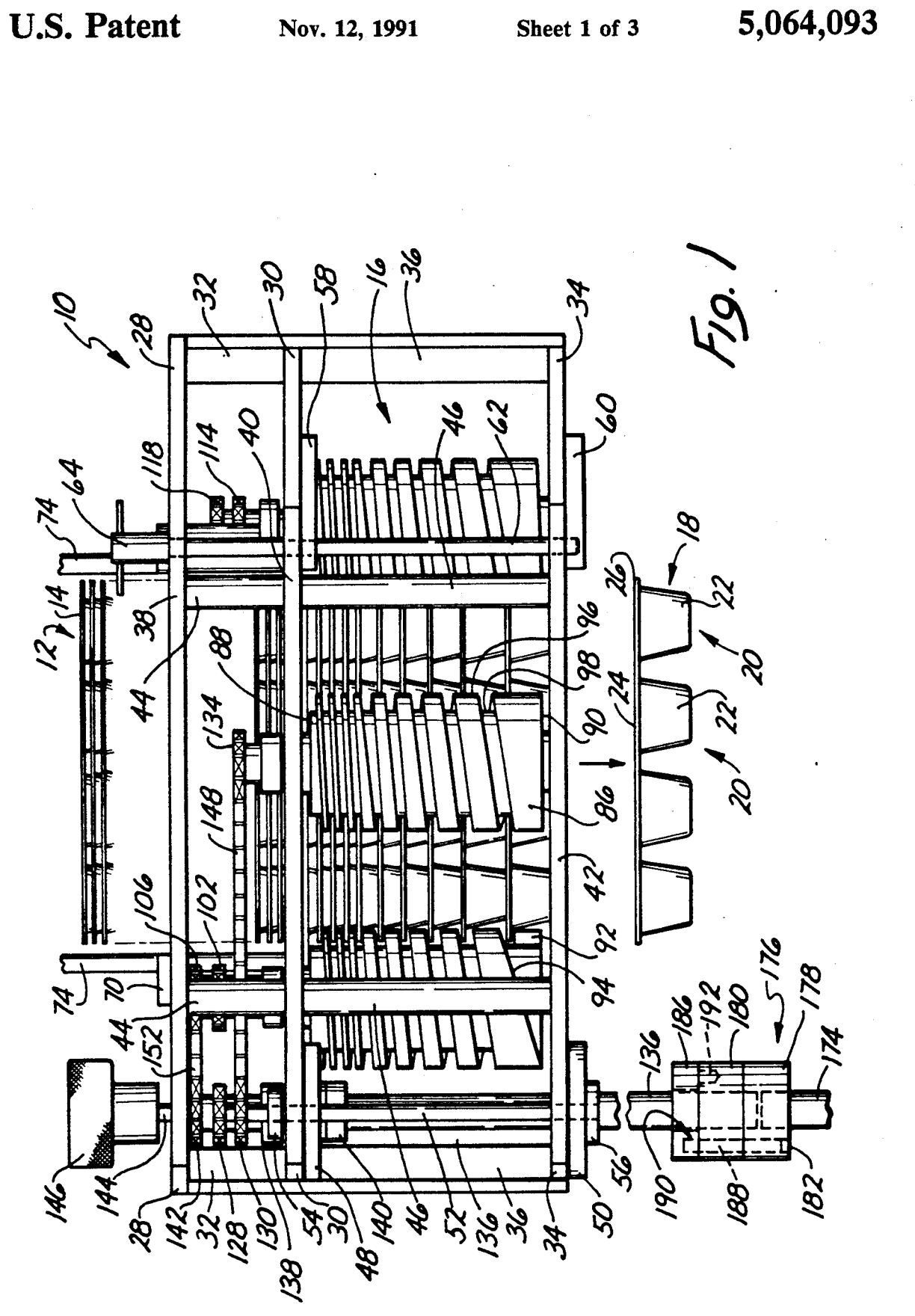

In FIG. 1 a nesting device 10 of the invention is shown in elevational view. FIG. 2 shows a top plan view of this same device. The device 10 includes a feed means, generally depicted at numeral 12 of FIG. 1, which feeds a stack of nested cup trays, generally depicted by the numeral 14 of FIG. 1, to a helical screw means, generally depicted by numeral 16 of FIG. 1. The feed means 12 and the helical screw means 16 are both mounted on a housing the separate components of which are individually identified below.

A drive means, whose separate components are also individually identified below, drives the helical screw means 16 such that an individual cup tray from the stack of nested cup trays 14 is separated from its neighbors and is expelled out of the bottom of the device 10 as a separated denested individual cup tray. Such a separated denested cup tray is shown as cup tray 18 of FIG. 1.

The cup tray 18, as well as the remainder of the cup trays located in the stack of nested cup trays 14, are each formed of a plurality of individual cups bodies collective identified by the numeral 20 having a reservoir 22 which is joined about a flange 24 to its neighboring cups in the matrix of the cup tray 18. The outside periphery of the flanges 24 of a cup tray form an outside tray edge identified by the numeral 26. In separating the cup tray 18 from other cup trays in the stack of nested cup trays 14, the tray edge 26 is utilized by the device 10. In separating the individual cup trays one from the other the helical screw means 16 interacts with the cup trays via the tray edges 26 by interleaving the tray edges 26 between adjacent turns of threads on the helical screw means 16. State another way, the tray edges 26 are captured between the crests of adjacent turns of the thread and are moved along the thread in response to rotation of the helical screw means.

The housing of the device 10 includes an upper plate 28 which is attached to an intermediate plate 30 via supports collectively identified by the numeral 32. The intermediate plate 30 in turn is attached to a bottom plate 34 via supports collectively identified by the numeral 36.

In FIG. 1, lying in front of the upper plate 28, which is fixed, is a movable plate, movable upper plate 38. In turn in lying in front of intermediate plate 30, which is also fixed, is a movable intermediate plate 40 and lying in front of bottom plate 34, additionally which is also fixed, is a movable bottom plate 42. The plates 38 and 40 are connected via supports collectively identified by the numeral 44 and the plates 42 and 40 connected via supports collectively identified by the numeral 46.

Hinge plates 48 and 50 are attached to the intermediate plate 30 and the bottom plate 34 respectively on the left hand side of the device 10. A shaft 52 is supported in the hinge plates 48 and 50 via an upper bushing 54 and a lower bushing 56. The shaft 52 passes through appropriate holes formed in the movable intermediate plate 40 and movable bottom plate 42 such that the assembly composed of the movable top plate 38, the movable intermediate plate 40 and the movable bottom plate 42 connected via the supports 44 and 46 can hinge or pivot via the shaft 52 outwardly from the remainder of the housing 18. As will be evident in greater detail below, this allows for pivoting of certain of the drive components of the denesting device 10 of the invention away from other components to provide for an access into the interior of the device 10 should it be necessary to access such interior because of a jam or the like of one of the cup trays of the stack of nested cup trays 14 in the mechanism of the device 10.

On the right hand side of FIG. 1 is an intermediate lock plate 58 and a bottom lock plate 60. An elongated rod 62 having a handle 64 on the top thereof slides through holes (only one of which is visible in the figures, hole 66 in intermediate lock plate 58 as seen in FIG. 4) appropriately formed in the intermediate and bottom lock plates 58 and 60 and through aligning holes (only one of which is visible, hole 68 in the movable top plate 38 also as seen in FIG. 4) in the movable plates 38, 40 and 42. The positioning of rod 62 through these holes reversibly locks or maintains the movable plates 38, 40 and 42 and apparatus attached thereto to the remainder of the housing.

The shape of each of the plates 28, 30 and 34 as seen in plan view in FIGS. 2 and 4 is a U shape or horse shoe shape. This, thus forms a cavity in the interior of the device 10. The fourth side of this cavity is closed via the movable plates 38, 40 and 42 pivoting about the shaft 52.

Spaced around the periphery of the U shaped opening in the top plate 38 are a plurality of brackets 70. In a like manner two brackets, collectively identified by the numeral 72, are positioned on the upper movable plate 38. Attaching to each of the brackets 70 or 72 are feed rods collectively identified by the numeral 74. These feed rods extend from a position located at about the same plane as the intermediate plate 30 or the movable intermediate plate 34 upwardly above the top surface of the upper plate 28 and its movable counterpart, movable top plate 38. The plurality of feed rods 74 form a support structure in the feed means 12 for supporting the stack of nested cup trays 14 within the denesting device 10.

Six identical helical screws 76, 78, 80, 82, 84 and 86 are positioned around the periphery of the opening in the plates 28, 30, 34, 38, 40 and 42. A portion of the helical screws, the five helical screws 76, 78, 80, 82 and 84, are appropriately journaled between the fixed intermediate plate 30 and the bottom plate 34. The remainder of the helical screws, the final helical screw 86, is appropriately journaled between the movable intermediate plate 40 and the movable plate 42.

In describing the structure and function of the identical helical screws 76, 78, 80, 82, 84 and 86, helical screw 86, as seen in FIG. 1, is used as an example that is illustrative of all of the helical screws. As is evident in FIG. 1, helical screw 86 has a variable thread. That is the distance between any two adjacent crowns (or roots) of the thread consistently increases as one goes down the thread from the upper part of the figure to the lower part of the figure. The thread is of a first pitch at a first end 88 of the thread. This end can be considered as the end having a lesser pitch. It further can be considered as the receiving end of the helical screw 86.

The pitch of the thread of helical screw 86 slowly and consistently increases until at the opposite end 90 it is of a second pitch which is a greater pitch. The end 90 can be considered as the discharge end of the helical screw 86. Intermediate the first lesser end 88 and the second greater end 90 of the thread on the helical screw 86, the pitch between any two adjacent turns of the thread changes either increasing in going from end 88 to 90, or if viewed the other way decreasing in going from end 90 to 88.

Viewing for a moment, helical screw 76 as seen in FIG. 1, that is the helical screw on the left hand side of the figure, at the end 90, the thread terminates at shoulder 92. The surface of the thread immediately above shoulder 92 at surface 94 is wedge shaped. This wedge shape surface pushing down on the tray edge 26 of a cup tray pushes or discharges a separated and denested cup tray out of the denesting device 10 onto a continuous belt (not shown or numbered) of a fill and seal cup packaging machine (also not shown or numbered) that would be located directly underneath the denesting device 10.

As is also seen in FIG. 1, again using the helical screw 86 as an example that is illustrative of all of the identical helical screws, the helical screw 86 has a thread having a series of crests 96 which are separated by roots 98. The tray edges 26 of trays being denested by the device 10 are interlocked or interleaved between crests of adjacent turns of the thread of the helical screw 86. Since the pitch of the thread of the helical screw 86 is variable, the width of crests 96 progressive gets wider in moving from end 88 to end 90. In a like manner the width of the roots 98 also get wider in moving from end 88 to end 90.

The helical screws 76, 78, 80, 82, 84 and 86 are rotated by a series of chains and sprockets identified below. The sprockets are located on axles (also identified below) which connect to the various helical screws. The sprockets and chains are positioned on the axles between the upper plates 28 and 38 and the intermediate plates 30 and 40. The sprockets and chains are located in one of three planes or levels above the helical screws. For the clarity of this specification the sprockets or chains in the lowest level just above the intermediate plates 30 and 40 are considered as lower sprockets or chains, the next level as intermediate sprockets or chains and the uppermost sprockets or chains which are proximal to the upper plate 28 are considered as upper sprockets or chains.

The helical screw 76 is journaled to the housing of the device 10 via an axle 100. The axle 100 carries an intermediate sprocket 102 thereon. The helical screw 78 is journaled to the housing of the device 10 via an axle 104. The axle 104 carries three chain sprockets thereon only one of which, upper sprocket 106, is identified in the figures. Situated on and locked to the axle 104 below chain sprocket 106 is an unseen (not separately identified or numbered) intermediate sprocket. Further also situated on and locked to axle 104 and located below the intermediate sprocket is an unseen (not separately identified or numbered) bottom sprocket.

Helical screw 80 is journaled on an axle 108 which carries two chain sprockets, only one of which, intermediate sprocket 110, can be seen in figures in FIG. 2. The unseen sprocket on axle 108 is a lower sprocket (not separately identified or numbered). Helical screw 82 is journaled on an axle 112. Two chain sprockets, again only one of which can be seen, intermediate sprocket 114, are also fixed to the axle 112. The unseen chain sprocket on axle 112 is a lower sprocket (not separately identified or numbered). Helical screw 84 is journaled to axle 116 which carries single intermediate sprocket 118 thereon.

Intermediate helical screws 78 and 80 is a further axle 120 which is journaled to the housing of the device 10. The axle 120 carries two chain sprockets, only one of which can be seen, intermediate sprocket 122. The unseen sprocket on axle 120 is a lower sprocket (not separately identified or numbered). In a similar manner axle 124 is journaled between helical screws 80 and 82 and carries two chain sprockets, only one of which can be seen in the figures, intermediate sprocket 126. The unseen sprocket on axle 124 is a lower sprocket (not separately identified or numbered).

Two chain sprockets, intermediate sprocket 128 and lower sprocket 130, are attached to the shaft 52 which, as described above, also serves as a pivot for the housing members carrying the helical screw 86. Helical screw 86 is journaled to movable intermediate plate 40 and movable bottom plate 42 via an axle 132 which carries a lower sprocket 134 thereon.

A drive shaft 136 is journaled between the intermediate plate 30 and the bottom plate 34 and is held in position via bushings 138 and 140. The drive shaft 136 carries an upper sprocket 142 thereon. Also fixed to drive shaft 136 and located below sprocket 142 is a further intermediate sprocket (not separately identified or numbered). Further above sprocket 142 on drive shaft 136 is an extension 144 having a knurled knob 146 fixed thereto.

For any and all of the above described axles, axles 100, 104, 108, 112, 116, 120, 124, 52 and 132, and for drive shaft 136, each of the various sprockets, both numbered and unnumbered, described as being associated with a respective axle or the drive shaft are fixed to that respective axle or shaft and rotate in unison with that respective axle or shaft. Thus if one sprocket on any particular axle or shaft rotates, both the axle or shaft it is located on and all other sprockets also located on and fixed to that axle or shaft rotate in unison.

A lower chain 148 connects between the lower sprocket 134 on shaft 132 and the lower sprocket 130 on shaft 52. An intermediate chain 150 connects between the intermediate sprocket 128 on shaft 52 and the unnumbered intermediate sprocket mounted on the drive shaft 136. An upper chain 152 connects between the upper sprocket 142 on shaft 136 and upper sprocket 106 on axle 104. A lower chain 154 connects between the unnumbered lower sprocket on axle 104 and unnumbered lower sprocket on axle 120. An intermediate chain 156 connects between the unnumbered intermediate sprocket on axle 104 and intermediate sprocket 102 on axle 100. An intermediate chain 158 connects between intermediate sprocket 122 on the axle 120 and intermediate sprocket 110 the axle 108. A lower chain 160 connects between the unnumbered lower sprocket on axle 108 and the unnumbered lower sprocket on axle 124. An intermediate chain 162 connects between the intermediate sprocket 126 on the axle 124 and intermediate sprocket 114 on axle 112. A lower chain 164 connects between the unnumbered lower sprocket on the axle 112 and the lower sprocket 118 on the axle 116.

By the above described chain and sprockets each of the helical screws 76, 78, 80, 82, 84 and 86 are interconnected to one another and to the shaft 136 or its extension 144 thereon. Thus, rotation of the shaft 136 or the knurled knob 146 on the extension 144 will rotate each of the helical screws 76, 78, 80, 82, 84 and 86 together in unison at the same rate of rotation.

The helical screws 76, 78, 80, 82, 84 and 86 are positioned phase wise with respect to a cup tray interleave in the thread of each of the helical screws 76, 78, 80, 82, 84 and 86 such that they are in phase in reference to their rotational position with respect to that cup tray. Further by the above describes chain and sprocket interconnection they are phase locked with respect to one another. A brief example will aid in understanding these concepts.

During manufacture and assembly of the device 10 when the above described chains are attached to the above described sprockets the helical screws 76, 78, 80, 82, 84 and 86 are positioned such that when they are all synchronously rotated by the above described chain and sprocket interaction, at some point during each rotation of the helical screws the shoulder 92 on helical screw 76 and the equivalent shoulders on the remainder of the helical screws will all be located directly underneath the tray edge 26 of a cup tray. At this point in time the shoulder 92 on the helical screw 76 will be located just underneath the left hand edge of a cup tray as is seen in FIG. 1.

If the absolute positioning of the helical screws is compared in reference to the housing of the device 10, a like shoulder (not separately identified or numbered) on the helical screw 86 would be rotated 90° out of phase with that with respect to the shoulder 92 on the helical screws 76. However when the position of the shoulder on the helical screw 86 with respect to the cup tray is considered, this shoulder is also located directly underneath the edge of the cup tray and thus with respect to the cup tray the phase of the helical screws 76 and 86 is the same.

In a like manner when compared in reference to the housing of the device 10 an equivalent shoulder (not separately identified or numbered) on the end 90 of the helical screw 84 will be rotated 180° with respect to the shoulder on the end 90 of the helical screw 76 and 90° with respect to the shoulder on the end 90 of helical screw 86 but since it too is positioned so as to be located under the edge of the cup tray, with respect to the cup tray it is in phase with the other helical screws.

The same is true with respect to helical screws 78, 80 and 82. When considered in reference to the housing of the device 10, the phase of the helical screw 78 will be exactly the same as that of 76, the phase of the helical screw 82 will be exactly the same as 84, and the phase of the helical screw 80 will be 180° out of phase with respect to that of the helical screw 86 but since each of these helical screws is initially position such that the shoulder on its end 90 is located under the edge of the cup tray at the same time as the shoulders on the ends 90 of the other helical screws are also located under the edge of the cup tray, each helical screw is in phase with the remainder of the other helical screws with respect to the cup tray.

By locating the helical screws such that they are phased locked together, i.e. their movements are coordinated, and such that they are in phase with respect to their positioning with respect to a cup tray, the tray edge 26 (and thus the individual cup tray bearing this edge) will move down between the crest of the threads on the respective helical screws in a level manner and will be released from the discharge end of each of the helical screws concurrently in time. Additionally the first thread crest at the end 88 of each of the respective helical screws will simultaneously engage the tray edge 26 of the lower most member of the nested cup trays 14 stacked in the feed means 12 which is not yet interleaved within the threads of the helical screws. The phase locking of the helical screws together and the phase positioning of the helical screws with respect to the cup trays contributes to the ability to operate the denesting device 10 of the invention at high speeds.

For the purposes of illustration, the helical screws 76, 78, 80, 82, 84 and 86 have been shown as being interconnected via chains and sprockets. Alternately they could be interconnected via appropriate gears and gear shafts. Such gears and gear shafts would also maintain the phasing locking of the helical screws 76, 78, 80, 82, 84 and 86.

In vacuum forming cup trays, a defective tray sometimes is produced during a "production run." This can occur because of variance in the thickness of the plastic sheet stock used in forming the trays or because of heat transfer problems or the like. In any event sometimes a defective cup tray becomes incorporated in a stack of nested cup trays. Such a defective tray can sometimes jam in either the denesting device 10 or in the cup packaging machine the device 10 is utilized to feed trays to.

If, for some reason a cup tray jams while it is engaged with helical screws of the denesting device 10 of the invention, the denesting device 10 can be stopped and the movable plates 38, 40 and 42 rotated away from the rest of the housing of the device 10 to remove the jammed cup tray. Since rotation of the plates 38, 40 and 42 also rotate the helical screw 86 out of the way, this opens up the U shape, or horse shoe shape of the remainder of the device 10 as seen in FIG. 4 allowing for sliding of a jammed cup tray out of the opened end of the U shape in the device 10.

A series of protective cover plates collective identified by the numeral 166 are hinged together via hinges 168, 170 and 172 allowing them to be moved out of the way when the movable plates 38, 40 and 42 are rotated about the axle 52 to access a jammed cup tray or the like in the device 10.

When the movable plates 38, 40 and 42 are rotated from the position seen in FIG. 2 to the position seen in FIG. 4, the sprocket 128 is held fast because of its interlink via chain 150 to the rest of the mechanisms, however, the chain 148 will be rotated (in reality - wrapped) clockwise around the sprocket 130. This will rotate the sprocket 134 and its axle 132 attached thereto counterclockwise. Rotation of axle 132 rotates the helical screw 86 through some phase angle counterclockwise positioning it out of sync with the other helical screws. However, when the movable plates 38, 40 and 42 are returned to the position seen in FIG. 2 the movement is just the opposite and the chain 148 will rotate the sprocket 34 through the same phase angle returning the helical screw 86 back in sync with the remainder of the helical screws. Thus when operation of the device 10 is resumed all of the helical screws are again phase locked and in phase with respect to a cup tray positioned in the device 10.

A shaft 174, from a prime mover (not shown or numbered), is connected via a clutch mechanism, generally identified by the numeral 176, to the drive shaft 136. Clutch mechanism 176 is shown in FIG. 1 in the orientation it would be in when the denesting device 10 was being powered via rotation from a prime mover via shaft 174. In FIG. 3, the clutch mechanism 176 is shown in a different orientation wherein rotation from the shaft 174 is not transferred to the shaft 136.

The clutch mechanism 176 is formed by a bushing 178 which is fixed to the shaft 174. A further bushing 180 is fixed to the shaft 136. The bushing 178 has an aperture 182 axially extending through it and the bushing 180 has a like aperture 184 axially extending through it. The apertures 182 and 184 are radially displaced from the center of rotation of the axially aligned shafts 136 and 174 the same distance such that they can be aligned as is seen in the figures.

A movable bushing 186 carries a pin 188 thereon. The movable bushing 186 contains a central opening 190 which allows the bushing 186 to both freely rotate circumferentially about the shaft 136 or move axially on the shaft 136. The pin 188 is radially displaced from the center of the opening 190 the same radial distance as are the apertures 182 and 184 from the center of the shafts 126 and 174. The diameter of the pin 188 is slightly less than the diameter of the apertures 182 and 184. This allows the pin 188 to be inserted into the aperture 184 and into the aperture 182 to interlock the bushing 178 to the bushing 180. When so interlocked rotation of the shaft 174 is transferred via bushing 178 to the pin 188 and via the pin 188 to the bushing 180 to rotate the shaft 136 and all the other mechanisms attached thereto.

The bushing 180 has a further aperture 192 formed therein. The aperture 192 is only drilled part way through the bushing 180 such that it has a blind end. When it is desirous to disconnect the denesting apparatus 10 from the shaft 174, the bushing 186 is slid axially upwardly along the shaft 136 and is then rotated circumferentially until the pin 188 is located in position to be inserted into the aperture 192. This holds the bushing 186 fixed. Since the pin 188 no longer connects the apertures 182 and 184 to connect bushing 180 to bushing 178, the shaft 136 can be rotated independent of rotation of the shaft 174

Generally the prime mover utilized to rotate the shaft 174 is a drive component of the cup packaging machine on which the apparatus 10 is attached. Thus mechanical output of the cup packaging machine is used to drive or power the various helical screws of the apparatus 10. It is recognized however that alternatively a dedicated drive mechanism could also be used to power the denesting device 10.

If power for rotation of the shaft 174 is directly from the fill and seal cup packaging machine, at the start of a product production cycle during the initial feeding of the stack of cup trays through the denesting device 10 and onto the continuous moving belt of the fill and seal cup packaging machine and under the fill head of the packaging machine, it is desirable not to have certain mechanisms of the cup packaging machine operating especially the product discharge pumps. Before any cup trays are positioned below the fill heads of the packaging machine ejection of product from the fill heads would contaminate the machine requiring cleaning and resterilization.

To avoid the above described problem cup trays are initially feed through the denesting device 10 and loaded onto the continuous belt of the packaging machine by rotation on the knurled knob 146 while the clutch mechanism 176 is disengaged (that is in the position as seen in FIG. 3). When the clutch mechanism 176 is so disengaged the knurled knob 146 can then be rotated to feed and denest a stack of cup trays located in the feed means 12. Hand rotation of the knurled knob 146 sequentially moves and denests individual cup trays until a first cup tray, as for instance, cup tray 18 is discharged into the continuous belt of the cup fill and seal packaging machine and is located under the fill head of the packaging machine.

At such time as the cup packaging machine is ready to be operated with cup trays loaded on its continuous belt and with the first row of cups of the leading cup tray positioned under machine fill head, the clutch mechanism 176 is rotated such that it is in the orientation as seen in FIG. 1, locking the shaft 136 to the shaft 174. The cup packaging machine is then started and further operation of the denesting device 10 is now powered by a prime mover of the cup packaging machine driving the denesting device 10 via the shaft 174.

I claim:

1. A denesting device comprising:

a housing;

feed means for containing a stack of nested articles, said feed means located on said housing;

helical screw means for engaging and separating nested articles, said helical screw means including a variable screw thread thereon;

said variable screw thread having a variable pitch that increases from a first lesser pitch portion to a second greater pitch portion;

said helical screw means rotatively located on said housing with said first lesser pitch portion of said variable screw thread located in operative association with said feed means in a position to engage nested articles stacked in said feed means;

drive means for rotating said helical screw means whereby upon rotation of said helical screw means said first lesser pitch portion of said variable screw thread engages articles stacked in said feed means and with continued rotation of said helical screw means said articles are moved along said helical screw means from said lesser thread pitch portion to said greater thread pitch portion with separation and denesting of adjacent articles initiating and then increasing as said articles move along said helical screw means from said lesser thread pitch portion to said greater thread pitch portion;

said helical screw means including a plurality of elongated helical screws;

each of said elongated helical screws including a variable pitch screw thread thereon; and said variable screw thread on each of said plurality of elongated helical screws being shaped as a square thread in cross section.

2. A denesting device of claim 1 wherein:

said feed means is sized and shaped to contain a stack of nested cup trays;

each of said cup trays of the type containing a plurality of cups joined together in a matrix; and each of said plurality of cups having a cup body with said cup trays nested into a stack by locating a portion of the body of a cup in one cup tray into the body of a cup in the next adjoining cup tray in said stack.

3. A denesting device of claim 1 wherein:

said plurality of elongated helical screws are located on said housing is a spaced array about said feed means.

4. A denesting device of claim 1 wherein:

said variable pitch on said variable screw thread varies from said lesser thread pitch portion to said greater thread pitch portion in a continuously increasing thread pitch transition.

5. A denesting device of claim 1 wherein:

said drive means includes means for rotating each of said plurality of elongated helical screws in unison at the same rate of rotation and phase locked with one another.

6. A denesting devices comprising:

a housing;

feed means for containing a stack of nested articles, said feed means located on said housing;

helical screw means for engaging and separating nested articles, said helical screw means including a variable screw thread thereon;

said variable screw thread having a variable pitch that increases from a first lesser pitch portion to a second greater pitch portion;

said helical screw means rotatively located on said housing with said first lesser pitch portion of said variable screw thread located in operative association with said feed means in a position to engage nested articles stacked in said feed means;

drive means for rotating said helical screw means whereby upon rotation of said helical screw means said first lesser pitch portion of said variable screw thread engages articles stacked in said feed means and with continued rotation of said helical screw means said articles are moved along said helical screw means from said lesser thread pitch portion to said greater thread pitch portion with separation and denesting of adjacent articles initiating and then increasing as said articles move along said helical screw means from said lesser thread pitch portion to said greater thread pitch portion;

said helical screw means includes a plurality of elongated helical screws;

each of said elongated helical screws including a variable pitch screw thread thereon;

each of said plurality of elongated helical screws has a receiving end and a discharge end;

said first lesser pitch portion of said variable screw thread on each of said plurality of elongated helical screws located at each receiving end and said second greater pitch portion of said variable pitch screw thread on each of said plurality of elongated helical screws located at said discharge end;

said receiving ends of said plurality of elongated helical screws positioned in operative association with said feed means; and said feed means being sized and shaped and positioned on said housing in association with said plurality of elongated helical screws such that a member of a stack of nested articles located in said feed means is supported on the screw thread at said receiving end of said plurality of elongated helical screws and becomes engaged in said screw thread in response to rotation of said screw thread.

7. A denesting device comprising:

a housing;

feed means for containing a stack of nested articles, said feed means located on said housing;

helical screw means for engaging and separating nested articles, said helical screw means including a variable screw thread thereon;

said variable screw thread having a variable pitch that increases from a first lesser pitch portion to a second greater pitch portion;

said helical screw means rotatively located on said housing with said first lesser pitch portion of said variable screw thread located in operative association with said feed means in a position to engage nested articles stacked in said feed means;

drive means for rotating said helical screw means whereby upon rotation of said helical screw means said first lesser pitch portion of said variable screw thread engages articles stacked in said feed means and with continued rotation of said helical screw means said articles are moved along said helical screw means from said lesser thread pitch portion to said greater thread pitch portion with separation and denesting of adjacent articles initiating and then increasing as said articles move along said helical screw means from said lesser thread pitch portion to said greater thread pitch portion;

said helical screw means includes a plurality of elongated helical screws;

each of said elongated helical screws including a variable pitch screw thread thereon;

said housing including a fixed section and a movable section, said movable section pivotally connected to said fixed section to move with respect to said fixed section; and a portion of said elongated helical screws mounted on said fixed section of said housing and a further portion of said elongated helical screws mounted on said movable section of said housing, said portion of said elongated helical screws mounted on said movable section of said housing being movable in concert with said movable section of said housing to move with respect to said fixed section of said housing and said portion of elongated helical screws mounted on said fixed section of said housing.

8. A denesting device of claim 7 wherein:

said feed means is located in part on said fixed section of said housing and in a further part on said movable section of said housing.

9. A denesting device of claim 7 wherein:

said drive means rotates each of said plurality of elongated helical screws in unison at the same rate of rotation; and said drive means located in a first part on said fixed section of said housing and in a further part on said movable section of said housing with said first part of said drive means operatively connected to said portion of said elongated helical screws mounted on said fixed section of said housing and said further part of said drive means operatively connected to said further portion of said helical screws mounted on said movable section of said housing.

10. A denesting device comprising:

a housing;

feed means for containing a stack of nested articles, said feed means located on said housing;

helical screw means for engaging and separating nested articles, said helical screw means including a variable screw thread thereon;

said variable screw thread having a variable pitch that increases from a first lesser pitch portion to a second greater pitch portion;

said helical screw means rotatively located on said housing with said first lesser pitch portion of said variable screw thread located in operative association with said feed means in a position to engage nested articles stacked in said feed means;

drive means for rotating said helical screw means whereby upon rotation of said helical screw means said first lesser pitch portion of said variable screw thread engages articles stacked in said feed means and with continued rotation of said helical screw means said articles are moved along said helical screw means from said lesser thread pitch portion to said greater thread pitch portion with separation and denesting of adjacent articles initiating and then increasing as said articles move along said helical screw means from said lesser thread pitch portion to said greater thread pitch portion; and said drive means including a first rotation means for rotating said helical screw means by a prime mover and a second rotation means for hand rotation of said helical screw means.

11. A denesting device of claim 10 wherein:

said first rotation means including a first shaft operatively connected to said prime mover so as to be rotated by said prime mover;

said first rotation means further includes a second shaft operatively connected to said helical screw means for rotation of said helical screw means; and said first rotation means further includes a clutch means for temporarily coupling said first and said second shafts together such that rotation of said first shaft by said prime mover is transferred to said second shaft to rotate said helical screw means.

12. A denesting device of claim 11 wherein:

the axis of rotation of said second shaft is aligned with said axis of rotation of said first shaft;

said clutch means includes first and second fixed bushings and a further movable bushing;

said first fixed bushing fixedly attached to one of said first and said second shaft, said second fixed bushing fixedly attached to the other of said first and said second shafts;

said first fixed bushing including an axially extending aperture located in said first fixed bushing in a position radially displaced at a measured distance from the axis of rotation of said first and said second shafts;

said second fixed bushing including an axially extending aperture located in said second fixed bushing in a position radially displaced at said measured distance from the axis of rotation of said first and said second shafts such that said aperture in said first fixed bushing and said aperture in said second fixed bushing can be aligned with one another by rotation of one of said first and second fixed bushing circumferentially with respect to the other about said axis of rotation of said first and second shafts;

said movable bushing including a central opening, said movable bushing rotatively and axially movably mounted about said central opening on said one of said first and said second shafts on which said first fixed bushing is mounted and positioned with respect to said first fixed bushing such that said first fixed bushing is located between said second fixed bushing and said movable bushing;

said movable bushing including a pin located on said movable bushing in a position radially displaced at said measured distance from the axis of rotation of said first and said second shafts, said pin sized and shaped to simultaneously fit into both said aperture on said first fixed bushing and said aperture on said second fixed bushing to connect said first fixed bushing to said second fixed bushing with respect to rotation about the axis of rotation of said first and second shafts whereby rotation of one of said first and second shafts is propagated to the other of said first and second shafts; and said movable bushing axially movable about said shaft it is rotatively mounted on to retract said pin from said aperture in at least said second fixed bushing to disrupt said connection of said first fixed bushing to said second fixed bushing.

13. A denesting device for cup trays wherein said cup trays are of the type containing a plurality of cups joined together in a matrix with each of said plurality of cups having a cup body and with said cup trays nestable one on another by locating a portion of the body of a cup in one cup tray into the body of a cup in an adjoining cup tray, said device comprising:

a housing;

feed means for containing a stack of said nested cup trays;

said feed means located on said housing;

a plurality of elongated helical screws, each of said helical screws including a variable screw thread thereon;

the variable screw thread on each of said plurality of elongated helical screws having a variable pitch that increases from a first lesser pitch portion to a second greater pitch portion;

said plurality of elongated helical screws rotatively mounted on said housing and located on said housing in a spaced array about said feed means with said first lesser pitch portion of said variable screw thread of each of said elongated helical screws located in operative association with said feed means in a position to engage nested cup trays stacked in said feed means;

drive means for rotating said elongated helical screws whereby upon rotation of said elongated helical screws said first lesser pitch portion of said variable screw thread of each of said elongated helical screws engages an edge of said cup trays stacked in said feed means and with continued rotation of said plurality of helical screws said cup trays are moved along the variable screw threads of said plurality of helical screws from said lesser thread pitch portion to said greater thread pitch portion with separation and denesting of adjacent cup trays initiated and then increasing as said cup trays move along said variable screw thread of said helical screws from said lesser thread pitch portion to said greater thread pitch portion;

said housing including a fixed section and a movable section, said movable section pivotally connected to said fixed section to move with respect to said fixed section; and a portion of said elongated helical screws mounted on said fixed section of said housing and a further portion of said elongated helical screws mounted on said movable section of said housing, said portion of said elongated helical screws mounted on said movable section of said housing being movable in concert with said movable section of said housing so as to move with respect to said fixed section of said housing and said portion of elongated helical screws mounted on said fixed section of said housing.

14. A cup tray denesting device of claim 13 wherein:

said housing includes a fixed section and a movable section, said movable section pivotally connected to said fixed section to move with respect to said fixed section;

a portion of said elongated helical screws mounted on said fixed section of said housing and a further portion of said elongated helical screws mounted on said movable section of said housing, said portion of said elongated helical screws mounted on said movable section of said housing being movable in concert with said movable section of said housing so as to move with respect to said fixed section said housing and said portion of elongated helical screws mounted on said fixed section of said housing.

15. A denesting device for cup trays wherein said cup trays are of the type containing a plurality of cups joined together in a matrix with each of said plurality of cups having a cup body and with said cup trays nestable one on another by locating a portion of the body of a cup in one cup tray into the body of a cup in an adjoining cup tray, said device comprising:

a housing;

feed means for containing a stack of said nested cup trays;

said feed means located on said housing;

a plurality of elongated helical screws, each of said helical screws including a variable screw thread thereon;

the variable screw thread on each of said plurality of elongated helical screws having a variable pitch that increases from a first lesser pitch portion to a second greater pitch portion;

said plurality of elongated helical screws rotatively mounted on said housing and located on said housing in a spaced array about said feed means with said first lesser pitch portion of said variable screw thread of each of said elongated helical screws located in operative association with said feed means in a position to engage nested cup trays stacked in said feed means;

drive means for rotating said elongated helical screws whereby upon rotation of said elongated helical screws said first lesser pitch portion of said variable screw thread of each of said elongated helical screws engages an edge of said cup trays stacked in said feed means and with continued rotation of said plurality of helical screws said cup trays are moved along the variable screw threads of said plurality of helical screws from said lesser thread pitch portion to said greater thread pitch portion with separation and denesting of adjacent cup trays initiated and then increasing as said cup trays move along said variable screw thread of said helical screws from said lesser thread pitch portion to said greater thread pitch portion;

each of said plurality of elongated helical screws having a receiving end and a discharge end;

said first lesser pitch portion of said variable screw thread on each of said plurality of elongated helical screws located at said receiving end and said second greater pitch portion of said variable screw thread on each of said plurality of elongated helical screws located at said discharge end;

said receiving ends of said plurality of elongated helical screws positioned in operative association with said feed means; and said feed means being sized and shaped and positioned on said housing in association with said plurality of elongated helical screws such that a member of a stack of nested cup trays located in said feed means is supported on the screw thread at said receiving end of said plurality of elongated helical screws and becomes engaged in and is moved by said screw thread in response to rotation of said screw thread.

16. A device for transferring rotation from a first rotating shaft to a second rotating shaft which is axially aligned with the first shaft comprising:

a first bushing, a second bushing and a further movable bushing;

said first bushing fixedly attached to said first shaft;

said second bushing fixedly attached to said second shaft;

said first bushing including a first aperture located in said first bushing in a position radially displaced at a measured distance from the axis of rotation of said first and said second shafts;

said second bushing including a second aperture located in said second bushing in a position radially displaced at said measured distance from the axis of rotation of said first and said second shafts such that said first aperture in said first bushing and said second aperture in said second bushing can be aligned with one another by rotation of one of said first and second bushing circumferentially with respect to the other about said axis of rotation of said first and second shafts;

said movable bushing including an central opening, said movable bushing rotatively and axially movable mounted about said central opening on said first shaft and positioned with respect to said first bushing such that said first bushing is located between said second bushing and said movable bushing;

said movable bushing including a pin located thereon in a position radially displaced at said measured distance from the axis of rotation of said first and said second shafts, said pin sized and shaped to simultaneously fit into both said first aperture on said first bushing and said second aperture on said second bushing to connect said first bushing to said second bushing with respect to rotation about the axis of rotation of said first and second shafts whereby rotation of one of said first and second shafts is propagated to the other of said first and second shafts; and said movable bushing axially movable about said first shaft to retract said pin from at least said second aperture in said second bushing to disrupt said connection of said first bushing to said second bushing.

17. A rotation transfer device of claim 16 wherein:

said first bushing includes a further aperture formed therein in parallel with said first aperture in said first bushing, said further aperture radially located in said first bushing at said measured distance from said axis of rotation of said first and said second shafts, said further aperture circumferentially displaced from said first aperture in said first bushing about said axis of rotation of said first and said second shafts;

said further aperture in said first bushing axially extending only a portion of the axial dimension of first bushing so as to terminate in a blind end in said first bushing; and said pin temporarily positionable in said further aperture of said first bushing to temporary retain said pin and temporarily prevent said pin from connecting between said first aperture in said first bushing and said second aperture in said second bushing.

* * * * *